Patented Dec. 26, 1933

1,940,818

UNITED STATES PATENT OFFICE 1,940,818

RUBBER COMPOSITION AND METHOD OF PRESERVING RUBBER

Waldo L. Semon, Cuyahoga Falls, Ohio, assignor to The B. F. Goodrich Company, New York, N. Y., a corporation of New York No Drawing. Application March 27, 1931, Serial No. 525,880. Renewed April 14, 1933

40 Claims. (Cl. 18—50)

This invention relates to the art of rubber manufacture, and particularly to the preparation of rubber compositions which resist the deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

The substances which are employed as anti-oxidants according to this invention are secondary amino derivatives of biphenyl, binaphthyl, and related aromatic compounds containing two directly connected aromatic nuclei. The preferred compounds are those in which the amino group on a biphenyl nucleus is attached to another biphenyl or other aromatic nucleus. Other basic or neutral substituents including the radicals of ethers, alcohols, primary or tertiary amines, etc. may be present, and in some cases may even increase the anti-oxidant power of the compounds. However, strongly acidic substituent groups such as carboxyl or sulphonic acid groups which have the effect of greatly retarding vulcanization, and other inorganic elements, prove disadvantageous in general either because of a reduced or even a negative anti-oxidant power or because of an undesirably strong effect on the vulcanization of the rubber.

For example, the following substances are typical members of the class of substances outlined above: di-biphenylamine, phenylamino biphenyl, tolylamino biphenyl, naphthylamino biphenyl, tolylamino bitolyl, p-phenylamino phenyl-naphthalene, phenyl dimethyl benzidine, monophenyl benzidine, diphenyl benzidine, dinaphthyl benzidine, ditolyl benzidine, dimethyl benzidine, di-benzyl benzidine, diphenyl tolidine, diphenyl dianisidine, diphenyl naphthidine, p-dimethyl-amino-phenylamino biphenyl, biphenyl anisidine, p-hydroxy phenylamino biphenyl, di-biphenyl ethylene diamine, di-biphenyl phenylene diamine, biphenylamino benzyl alcohol, etc. It will be understood that the term "biphenyl" is not here employed to refer to two separate phenyl groups, but rather to the biphenyl radical consisting of two distinct benzene rings connected by a single bond. The term "biaryl" is similarly employed in the appended claims to designate a radical containing two distinct ring nuclei connected to one another by a single bond.

Any one or a mixture of several of the above-enumerated substances or of these substances with other known anti-oxidants may be incorporated into rubber with good effect on its age-resisting properties. For example, from ¼ to 5% of such an anti-oxidant may be mixed with the rubber before vulcanization, the anti-oxidant having substantially no accelerating effect and therefore ordinarily not necessitating an adjustment of vulcanizing conditions. Alternately, the anti-oxidant may be applied to the surface of crude or vulcanized rubber, say in the form of a powder, paste, or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulfur 5.5 parts, zinc oxide 30 parts, gas black 40 parts, mineral rubber 10 parts, palm oil 5 parts, and hexamethylene tetramine 0.75 parts. This was divided into portions, some of which were used as controls. To each of the others was added 0.95 parts (0.5% of the weight of the composition) of one of the above-described anti-oxidants. The compositions were thoroughly mixed and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. The results of the tests are given in the table below, in which T indicates ultimate tensile strength in pounds per sq. in. and E indicates ultimate elongation in per cent. of original length, each of the tests being accompanied by a control test of the composition without the antioxidant.

*Aging tests*

| Anti-oxidant | Before aging | | After 7 days in the Geer oven | | After 48 hours in the Bierer-Davis bomb | |
|---|---|---|---|---|---|---|
| | T | E | T | E | T | E |
| None (control) | 3382 | 633 | 1608 | 447 | 779 | 330 |
| Beta-naphthyl biphenylamine | 3365 | 663 | 2160 | 490 | 1751 | 520 |
| None (control) | 3565 | 653 | 1904 | 443 | 904 | 333 |
| Tolylamino bitolyl | 3367 | 667 | 2396 | 535 | 2213 | 573 |
| None (control) | 3630 | 686 | 1610 | 420 | 935 | 367 |
| Di-biphenyl p-phenylene diamine | 3435 | 653 | 3303 | 603 | 2754 | 577 |
| None (control) | 3329 | 620 | 1506 | 407 | 516 | 190 |
| Diphenyl 2.5 diamino biphenyl | 3365 | 650 | 2749 | 520 | 2206 | 495 |
| None (control) | 3597 | 660 | 1886 | 500 | | |
| Diphenyl diamino binaphthyl | 3555 | 697 | 2059 | 530 | | |
| None (control) | 3340 | 685 | | | 375 | 295 |
| Di-biphenylamine | 3325 | 680 | | | 1990 | 565 |
| None (control) | 3940 | 607 | 2077 | 442 | 950 | 337 |
| Diphenyl benzidine | 3974 | 640 | 2935 | 530 | 2571 | 587 |
| None (control) | 3590 | 620 | | | 868 | 290 |
| Di-beta-naphthyl benzidine | 3526 | 680 | | | 2161 | 560 |

It is evident from the above examples that rubber compositions containing even small proportions of the anti-oxidants of this invention resist deterioration far more effectively than similar untreated compositions.

Obviously, the practice of this invention is not limited to the specific compositions given above, such compositions being merely illustrative of one manner of employing the anti-oxidants of this invention. The anti-oxidants may be employed in conjunction with other vulcanizing agents than those here specifically disclosed, for this invention is applicable generally to pure rubber or rubber compositions of the most varied nature.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed certain preferred manners of performing my invention, I do not thereby desire or intend to limit myself solely thereto, for as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a secondary monoamine in which one of the groups attached to the amino nitrogen consists of two distinct, but directly connected, aromatic ring structures.

2. The method of preserving rubber which comprises treating rubber with a secondary arylamino biaryl compound containing a single amino group.

3. The method of preserving rubber which comprises treating rubber with a secondary mono-amino biphenyl compound.

4. The method of preserving rubber which comprises treating rubber with a secondary mono-amino biphenyl compound consisting solely of the elements carbon, hydrogen, and nitrogen.

5. The method of preserving rubber which comprises treating rubber with an arylamino biphenyl compound consisting solely of the elements carbon, hydrogen, and nitrogen, the single nitrogen atom constituting a secondary amino group.

6. The method of preserving rubber which comprises treating rubber with a secondary p-amino biphenyl containing a single amino group.

7. The method of preserving rubber which comprises treating rubber with an aryl substituted mono-amino biphenyl.

8. The method of preserving rubber which comprises treating rubber with di-biphenylamine.

9. The method of preserving rubber which comprises vulcanizing rubber in the presence of a secondary mono-amino biphenyl compound.

10. A composition comprising rubber and a secondary mono-amine in which one of the groups attached to the amino nitrogen consists of two distinct, but directly connected, aromatic ring structures.

11. A composition comprising rubber and a secondary arylamino biaryl compound containing a single amino group.

12. A composition comprising rubber and a secondary mono-amino biphenyl compound.

13. A composition comprising rubber and a secondary mono-amino biphenyl compound consisting solely of the elements carbon, hydrogen, and nitrogen.

14. A composition comprising rubber and an arylamino biphenyl compound consisting solely of the elements carbon, hydrogen, and nitrogen, the single nitrogen atom constituting a secondary amino group.

15. A composition comprising rubber and a secondary p-amino biphenyl containing a single amino group.

16. A composition comprising rubber and a mono-aryl substituted p-amino biphenyl containing a single amino group.

17. A composition comprising rubber and an aryl substituted mono-amino biphenyl.

18. A composition comprising rubber and a di-biphenylamine.

19. A composition comprising rubber which has been vulcanized in the presence of a secondary mono-amino biphenyl compound.

20. A process of treating rubber which comprises heating rubber and sulfur in the presence of an anti-oxidant comprising a reaction product of a mono-amino diphenyl and an aryl hydroxide.

21. A process of treating rubber which comprises heating rubber and sulfur in the presence of an anti-oxidant comprising a reaction product of a mono-amino diphenyl and a naphthol.

22. A process of treating rubber which comprises heating rubber and sulfur in the presence of an anti-oxidant comprising a reaction product of a mono-amino diphenyl and beta naphthol.

23. A process of treating rubber which comprises heating rubber and sulfur in the presence of an anti-oxidant comprising a reaction product of para amino diphenyl and a naphthol.

24. A process of treating rubber which comprises heating rubber and sulfur in the presence of an anti-oxidant comprising a reaction product of para amino diphenyl and an aryl hydroxide.

25. A process of treating rubber which comprises heating rubber and sulfur in the presence of an anti-oxidant comprising a reaction product of para amino diphenyl and beta naphthol.

26. A process of treating rubber which comprises heating rubber and sulfur in the presence of an anti-oxidant comprising a reaction product of substantially equi-molecular proportions of para amino diphenyl and beta naphthol.

27. The vulcanized rubber product prepared by vulcanizing rubber in the presence of an anti-oxidant comprising a reaction product of a mono-amino diphenyl and an aryl hydroxide.

28. The vulcanized rubber product prepared by vulcanizing rubber in the presence of an anti-oxidant comprising a reaction product of a mono-amino diphenyl and a naphthol.

29. The vulcanized rubber product prepared by vulcanizing rubber in the presence of an anti-oxidant comprising a reaction product of a mono-amino diphenyl and beta naphthol.

30. The vulcanized rubber product prepared by vulcanizing rubber in the presence of an anti-oxidant comprising a reaction product of para amino diphenyl and an aryl hydroxide.

31. The vulcanized rubber product prepared by vulcanizing rubber in the presence of an anti-oxidant comprising a reaction product of para amino diphenyl and a naphthol.

32. The vulcanized rubber product prepared by vulcanizing rubber in the presence of an anti-oxidant comprising a reaction product of para amino diphenyl and beta naphthol.

33. The vulcanized rubber product prepared by vulcanizing rubber in the presence of an anti-oxidant comprising a reaction product of substantially equi-molecular proportions of para amino diphenyl and beta naphthol.

34. The vulcanized rubber product prepared by vulcanizing rubber in the presence of an anti-oxidant comprising a reaction product of a mono-amino diphenyl and a mono-hydroxy aryl compound.

35. The method of preserving rubber which comprises treating rubber with beta-naphthyl biphenylamine.

36. The method of preserving rubber which comprises treating rubber with phenylamino biphenyl.

37. The method of preserving rubber which comprises treating rubber with a mono-aryl derivative of an amine selected from the class consisting of amino biphenyl and its homologues.

38. A composition comprising rubber and beta-naphthyl biphenylamine.

39. A composition comprising rubber and phenylamino biphenyl.

40. A composition comprising rubber and a mono-aryl derivative of an amine selected from the class consisting of amino biphenyl and its homologues.

WALDO L. SEMON.